US010645269B2

(12) United States Patent
Takagi

(10) Patent No.: US 10,645,269 B2
(45) Date of Patent: May 5, 2020

(54) COMMUNICATION APPARATUS FOR WIRELESSLY COMMUNICATING WITH EXTERNAL APPARATUS, METHOD, AND RECORDING MEDIUM

(71) Applicant: CANON KABUSHIKI KAISHA, Tokyo (JP)

(72) Inventor: Toshiyuki Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 15/990,470

(22) Filed: May 25, 2018

(65) Prior Publication Data

US 2018/0352136 A1 Dec. 6, 2018

(30) Foreign Application Priority Data

Jun. 1, 2017 (JP) .................................. 2017-109336

(51) Int. Cl.
*H04N 5/232* (2006.01)
*G08C 17/02* (2006.01)
(Continued)

(52) U.S. Cl.
CPC ......... *H04N 5/23206* (2013.01); *G08C 17/02* (2013.01); *H04N 5/23241* (2013.01); *H04N 5/23245* (2013.01); *H04N 5/232411* (2018.08); *H04W 4/23* (2018.02); *H04W 52/0267* (2013.01); *H04W 52/0274* (2013.01); *G08C 2201/20* (2013.01)

(58) Field of Classification Search
CPC ........... H04N 5/23203; H04N 5/23206; H04N 5/23241; H04N 5/232411; H04N 5/23245; H04W 52/0267; H04W 52/027; H04W 52/0274
See application file for complete search history.

(56) References Cited

U.S. PATENT DOCUMENTS 7,987,378 B2 * 7/2011 Lee ..................... H04W 52/028
713/320
9,485,431 B2 * 11/2016 Ohshima ............ H04N 5/23293
(Continued)

FOREIGN PATENT DOCUMENTS

JP 2007-215070 A 8/2007
JP 2015-152958 A 8/2015

*Primary Examiner* — Daniel M Pasiewicz
(74) *Attorney, Agent, or Firm* — Canon U.S.A., Inc., IP Division

(57) ABSTRACT

A communication apparatus includes a power source, a power switch, a wireless communication unit that establishes a wireless communication with a selected external apparatus from among a plurality of external apparatuses including a first external apparatus and a second external apparatus, and a control unit that controls the communication apparatus. In a first state where an operation state of the power switch is OFF, the wireless communication unit establishes a wireless communication with the first external apparatus and does not establish a wireless communication with the second external apparatus. In a second state where the operation state of the power switch is ON and power supply from the power source to at least the control unit is limited, the wireless communication unit establishes a wireless communication with the first and the second external apparatuses.

9 Claims, 12 Drawing Sheets

(51) Int. Cl.
*H04W 4/23* (2018.01)
*H04W 52/02* (2009.01)

(56) References Cited

U.S. PATENT DOCUMENTS

| | | | | |
|---|---|---|---|---|
| 2005/0046727 | A1* | 3/2005 | Nozaki | H04N 1/00347 |
| | | | | 348/333.07 |
| 2013/0235222 | A1* | 9/2013 | Karn | H04N 5/23203 |
| | | | | 348/211.2 |
| 2014/0220886 | A1* | 8/2014 | Adrangi | H04W 52/0229 |
| | | | | 455/41.1 |
| 2015/0049206 | A1* | 2/2015 | Eshita | H04N 5/2251 |
| | | | | 348/207.11 |
| 2015/0201131 | A1* | 7/2015 | Ohshima | H04N 5/23293 |
| | | | | 348/333.07 |
| 2017/0366753 | A1* | 12/2017 | Liu | H04L 43/10 |
| 2018/0025621 | A1* | 1/2018 | Huang | G08B 29/185 |

* cited by examiner

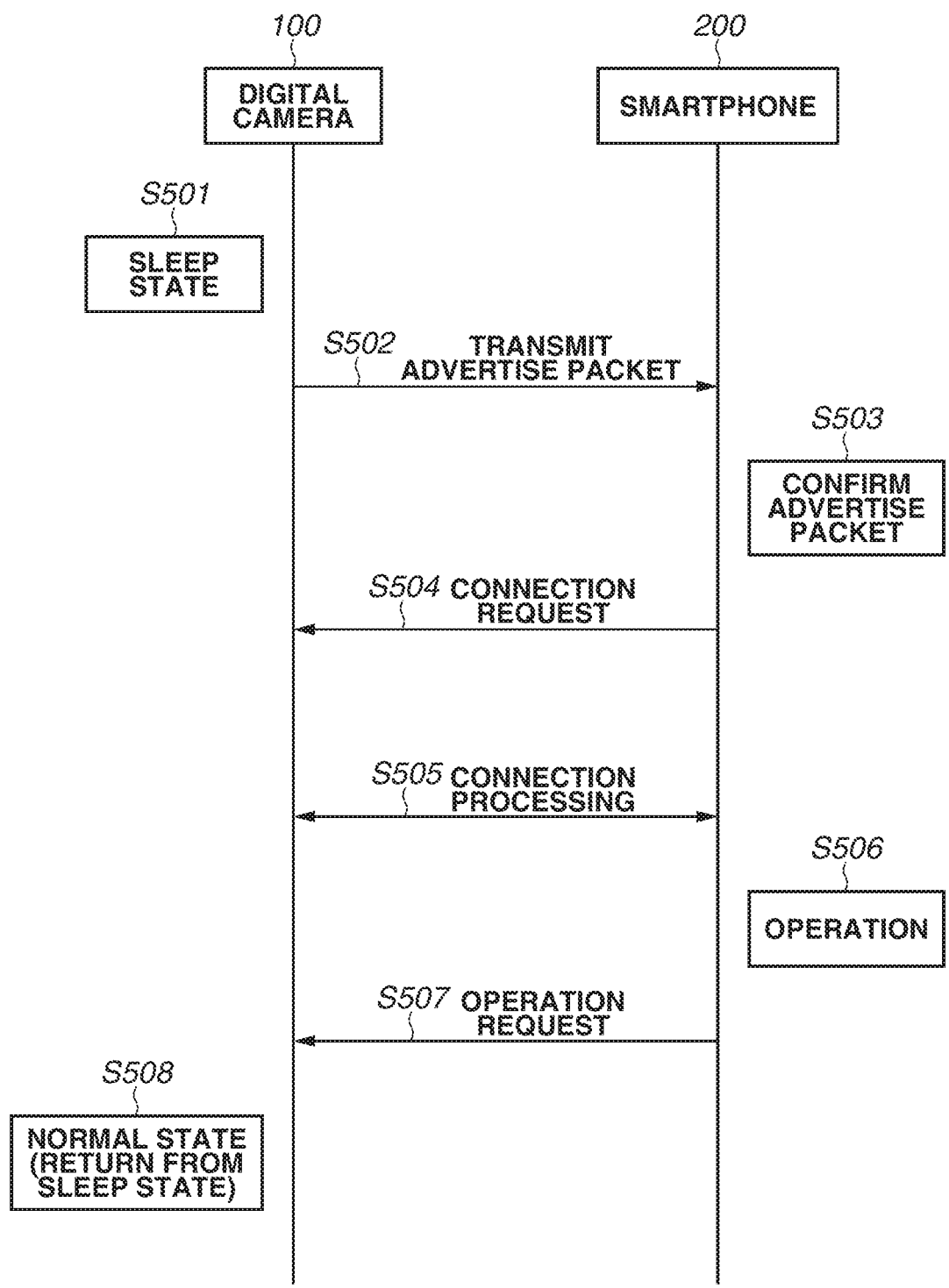

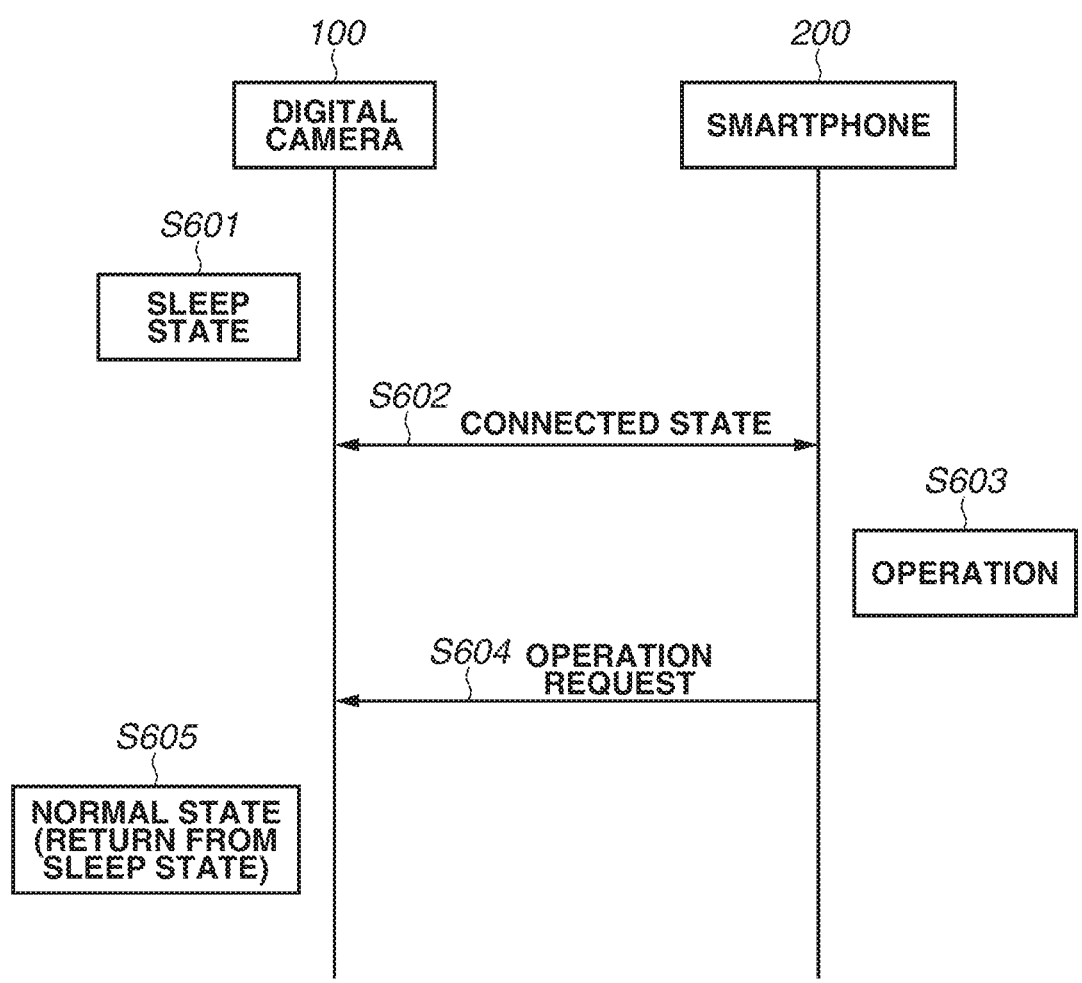

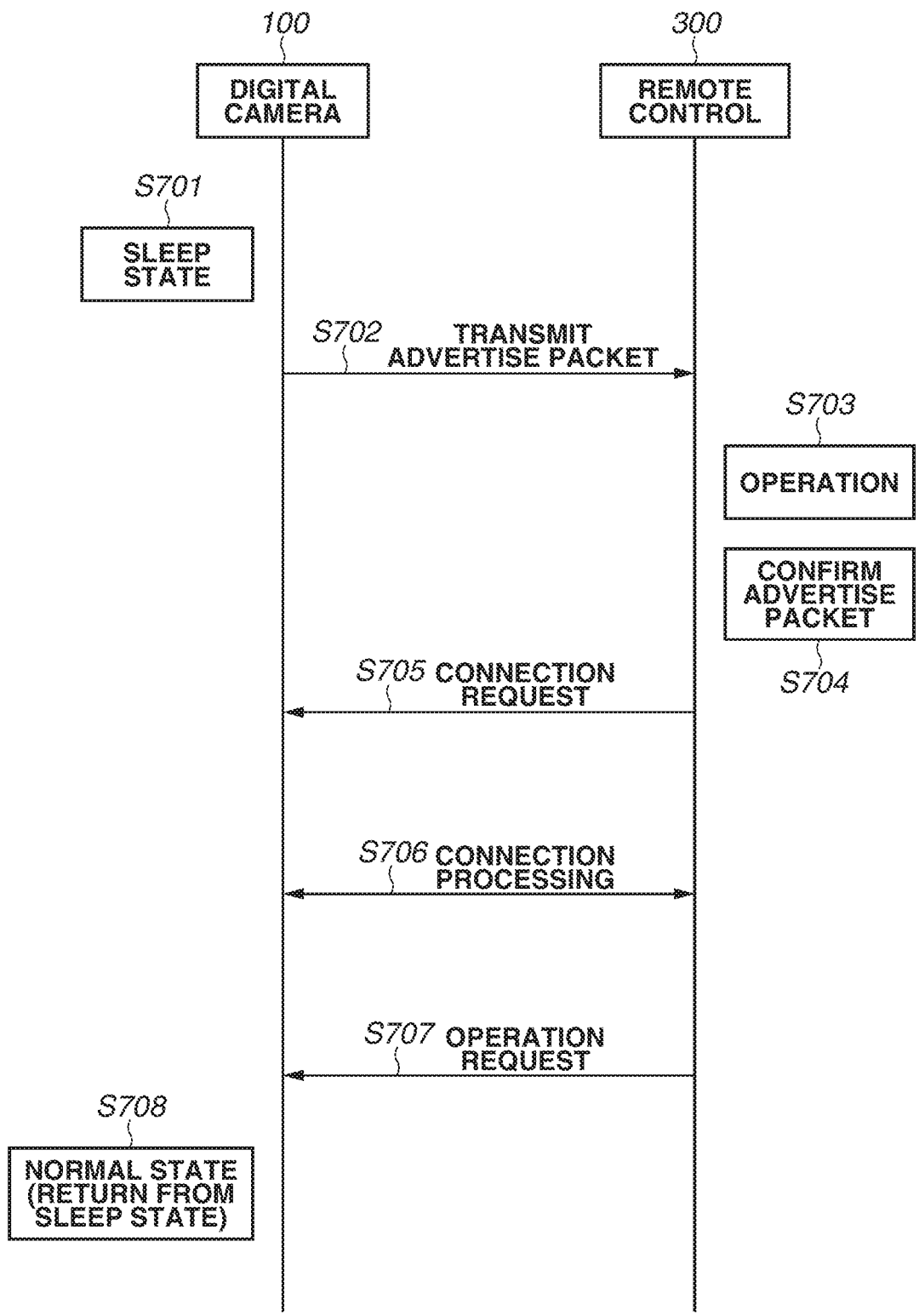

FIG.9A
CONNECTION PARTNER: SMARTPHONE

| AD Structure 1 | AD Structure 2 | ... | AD Structure M (CONNECTION PARTNER) | AD Structure N |

| Length | Data 0x0001 (SMARTPHONE) |

FIG.9B
CONNECTION PARTNER: REMOTE CONTROL

| Length | Data 0x0002 (REMOTE CONTROL) |

FIG.9C
CONNECTION PARTNER: NONE
IMAGING AND VIEWING ENABLED

| AD Structure 1 | AD Structure 2 | ... | AD Structure M (CONNECTION PARTNER) | AD Structure N (CAMERA STATE) |

| Length | Data 0x0000 (CONNECTION PARTNER NOT SET) |

| Length | Data BIT 0 (IMAGING ENABLE BIT): 1 (SUPPORTED) BIT 1 (VIEWING ENABLE BIT): 1 (SUPPORTED) |

FIG.9D
CONNECTION PARTNER: NONE
VIEWING ENABLED

| Length | Data 0x0000 (CONNECTION PARTNER NOT SET) |

| Length | Data BIT 0 (IMAGING ENABLE BIT): 0 (NOT SUPPORTED) BIT 1 (VIEWING ENABLE BIT): 1 (SUPPORTED) |

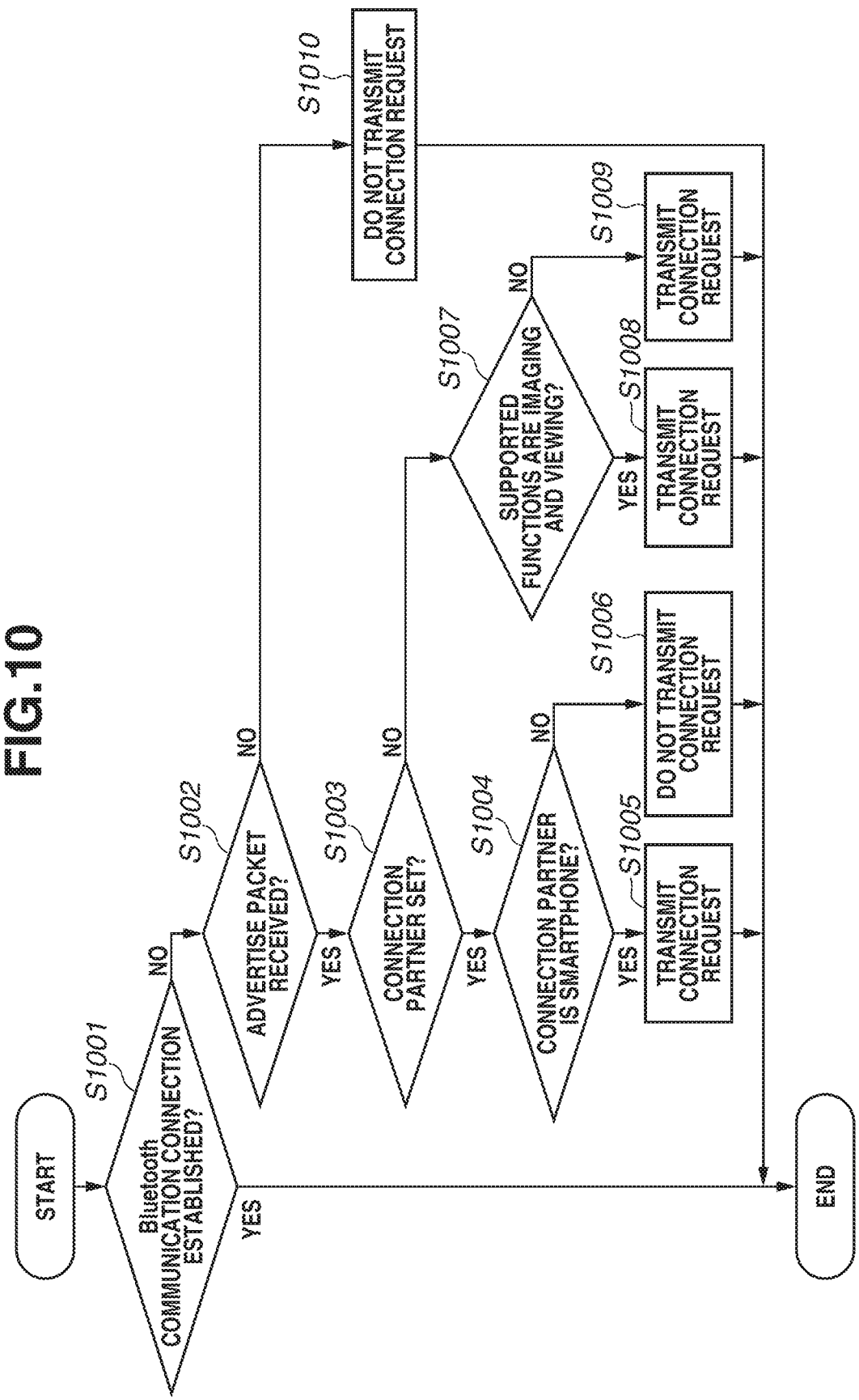

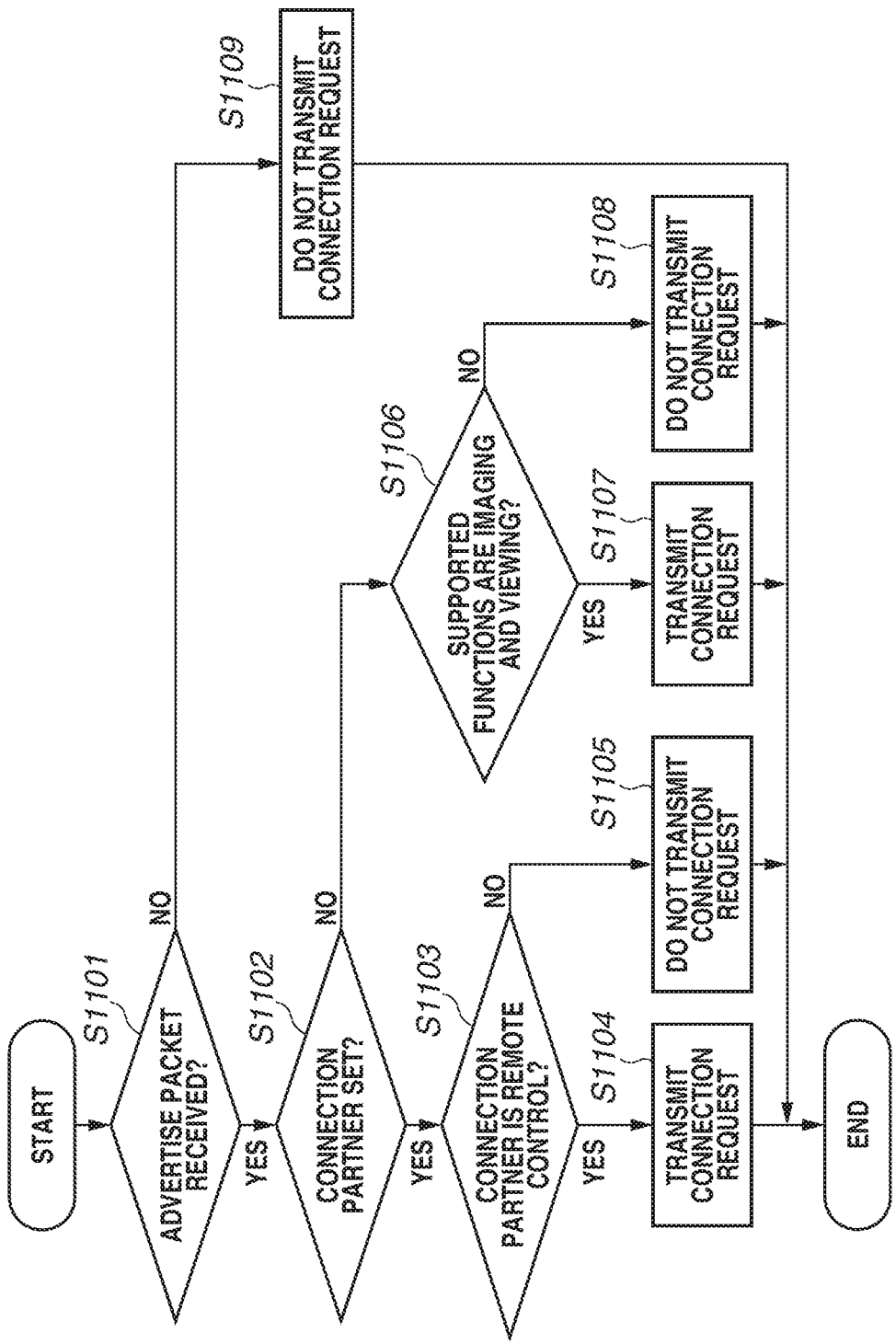

COMMUNICATION APPARATUS FOR WIRELESSLY COMMUNICATING WITH EXTERNAL APPARATUS, METHOD, AND RECORDING MEDIUM

BACKGROUND

Field

The present disclosure relates to a communication apparatus that wirelessly communicates with another apparatus, a method for controlling the communication apparatus, and a program for causing a computer to function as each unit of the communication apparatus.

Description of the Related Art

Conventionally, as a communication apparatus capable of wirelessly communicating with another apparatus, Japanese Patent Application Laid-Open No. 2007-215070 discusses a communication apparatus that includes a plurality of communication modes and confirms a communication mode of the other apparatus, which is a communication partner, and accordingly changes its own communication mode. Japanese Patent Application Laid-Open No. 2015-152958 discusses a communication apparatus that changes the contents of a wireless communication based on another apparatus, which is a communication partner selected by a user.

In recent years, a technique has been proposed in which wireless communication is performed between a digital camera as a communication apparatus and a smartphone or a remote control, and an operation is performed on the digital camera from the smartphone or the remote control.

In recent years, another technique has been proposed in which, when a digital camera as a communication apparatus receives a wireless communication connection request from a smartphone or a remote control while the digital camera is in a sleep state for power saving, the digital camera returns from the sleep state to a normal state. In particular, there has been technique for performing wireless communication with another apparatus by using a close-proximity wireless communication such as Bluetooth®. This Bluetooth® communication is characterized, for example, in providing smaller power consumption than a wireless local area network (LAN) communication.

Accordingly, a digital camera is able to maintain a Bluetooth® communication with a smartphone or a remote control even in the sleep state, and a user can return the digital camera to the normal state by operating the smartphone or the remote control at an arbitrary timing.

SUMMARY

According to an aspect of the present disclosure, a communication apparatus includes a power source, a power switch, a wireless communication unit configured to establish a wireless communication with a selected external apparatus from among a plurality of external apparatuses including a first external apparatus and a second external apparatus, and a control unit configured to control the communication apparatus. In a first state where an operation state of the power switch is OFF, the wireless communication unit performs control to establish a wireless communication with the first external apparatus and not to establish a wireless communication with the second external apparatus. In a second state where the operation state of the power switch is ON and power supply from the power source to at least the control unit is limited, the wireless communication unit performs control to establish a wireless communication with the first and the second external apparatuses.

Further features will become apparent from the following description of exemplary embodiments with reference to the attached drawings.

BRIEF DESCRIPTION OF THE DRAWINGS

FIG. 5 is a diagram illustrating an example sequence in which, when the smartphone is operated while the digital camera (communication apparatus) illustrated in FIG. 1 is in the sleep state, the digital camera returns from the sleep state to the normal state.

FIG. 6 is a diagram illustrating another example sequence in which, when the smartphone is operated while the digital camera (communication apparatus) illustrated in FIG. 1 is in the sleep state, the digital camera returns from the sleep state to the normal state.

FIG. 7 is a diagram illustrating an example sequence in which, when the remote control is operated while the digital camera (communication apparatus) illustrated in FIG. 1 is in the sleep state, the digital camera returns from the sleep state to the normal state.

FIGS. 9A to 9D are diagrams illustrating example structures of advertise packets transmitted from the digital camera (communication apparatus) according to the exemplary embodiment.

FIG. 10 is a flowchart illustrating an example of a processing procedure in a control method for the smartphone according to the exemplary embodiment.

FIG. 11 is a flowchart illustrating an example of a processing procedure in a control method for the remote control according to the exemplary embodiment.

DESCRIPTION OF THE EMBODIMENTS

An exemplary embodiment will be described below with reference to the accompanying drawings. The following exemplary embodiment is merely one example and can be appropriately modified or changed depending on individual configurations and various conditions of apparatuses. More specifically, while, in the following exemplary embodiment, a digital camera, which is an imaging apparatus, is applied to the communication apparatus, the communication apparatus is not limited thereto. For example, an information processing apparatus such as a portable media player, a tablet device, and a personal computer (PC) are also applicable as the communication apparatus.

<Overall Configuration of Communication Network System 10>

Figure 1:
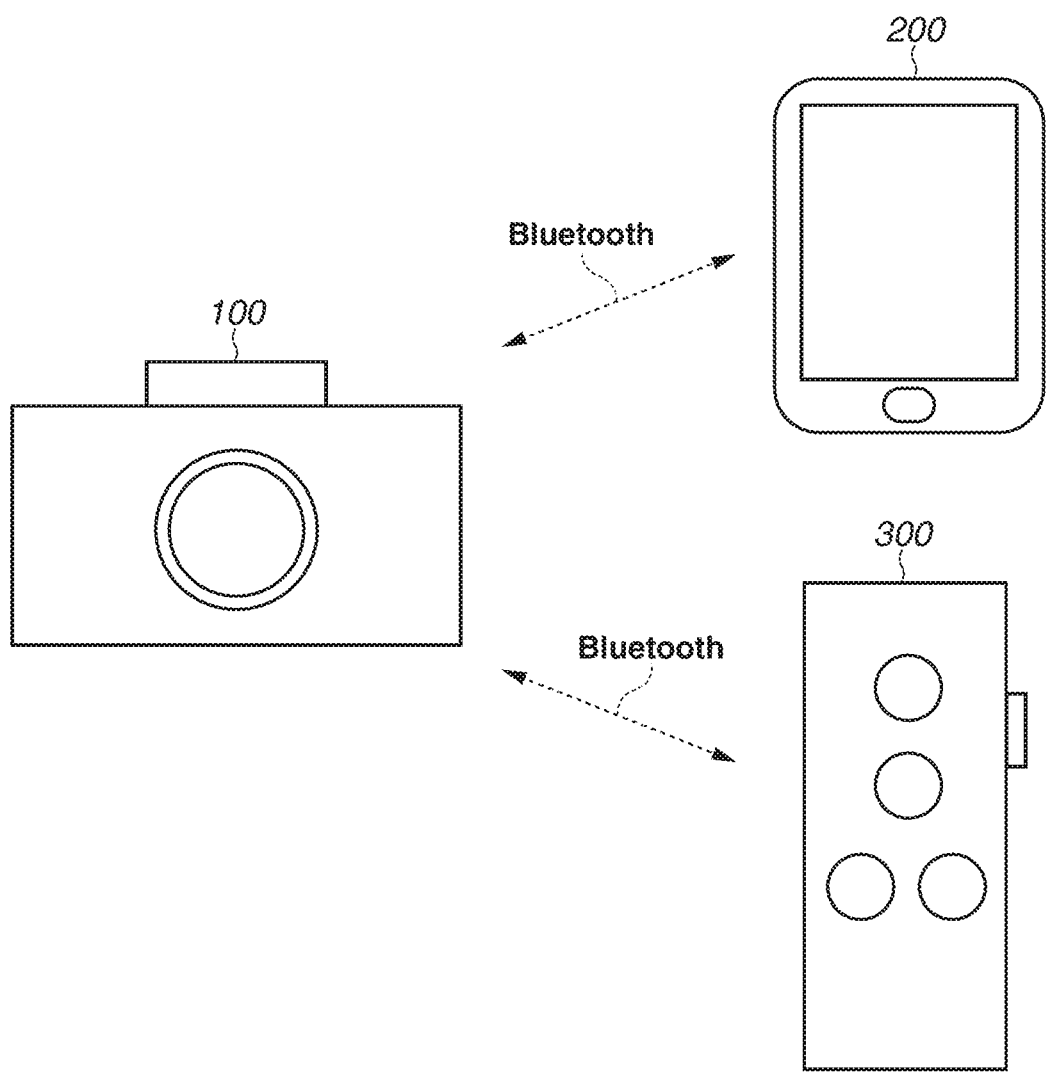
FIG. 1 illustrates a diagram illustrating an example of an overall configuration of a communication network system according to an exemplary embodiment.

FIG. 1 illustrates an example of an overall configuration of a communication network system 10 according to the exemplary embodiment. As illustrated in FIG. 1, the communication network system 10 according to the present exemplary embodiment includes a digital camera 100, a smartphone 200, and a remote control 300.

The digital camera 100 is a communication apparatus that wirelessly communicates with the smartphone 200 and the remote control 300, which are other apparatuses serving as external apparatuses. FIG. 1 illustrates an example where the digital camera 100, the smartphone 200, and the remote control 300 perform Bluetooth® close-proximity wireless communication.

<Overall Configuration of Digital Camera 100>

Figure 2:
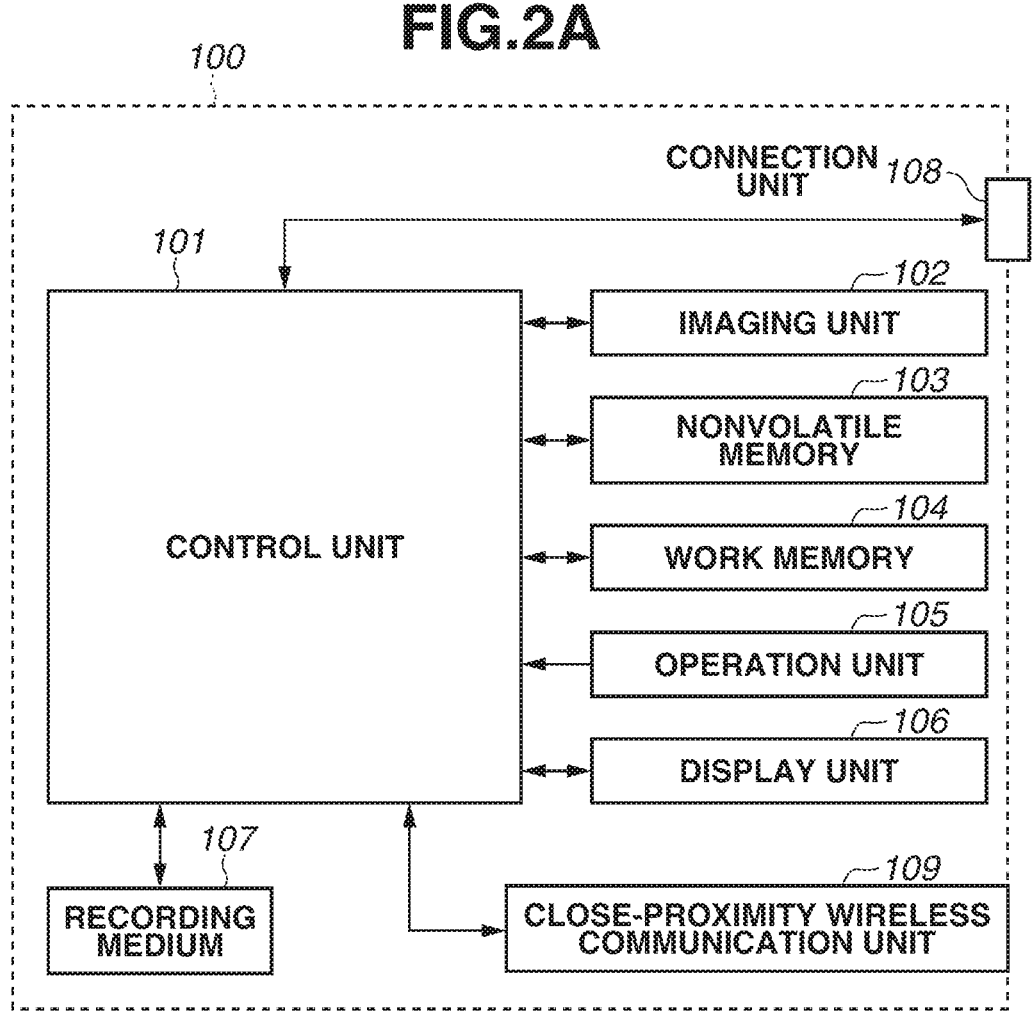
FIG. 2A is a diagram illustrating an example of an overall configuration of a digital camera (communication apparatus) illustrated in FIG. 1 according to the exemplary embodiment.
FIG. 2B is a diagram illustrating example functions of the digital camera illustrated in FIG. 1 which are enabled upon an operation of external apparatuses.

FIG. 2A illustrates an example of an overall configuration of the digital camera (communication apparatus) 100 illustrated in FIG. 1 according to the exemplary embodiment. FIG. 2B illustrates example functions of the digital camera 100 illustrated in FIG. 1 that are enabled upon an operation of external apparatuses. More specifically, FIG. 2A illustrates an example of an overall configuration of the digital camera 100 according to the present exemplary embodiment, and FIG. 2B illustrates example functions of the digital camera 100 according to the present exemplary embodiment enabled upon an operation of external apparatuses.

As illustrated in FIG. 2A, the digital camera 100 includes a control unit 101, an imaging unit 102, a nonvolatile memory 103, a work memory 104, an operation unit 105, a display unit 106, a recording medium 107, a connection unit 108, and a close-proximity wireless communication unit 109.

According to an input signal and a predetermined program, the control unit 101 controls each component of the digital camera 100 to comprehensively control operations of the digital camera 100. Instead of the control unit 101 controlling operations of the digital camera 100, a plurality of hardware components can share processing to control the entire apparatus.

The imaging unit 102 includes, for example, an optical system for controlling an optical lens unit, diaphragm, zoom, and focus, and an image sensor for converting light (image) introduced through the optical lens unit into an electrical image signal. A complementary metal oxide semiconductor (CMOS) sensor or a charge coupled device (CCD) sensor is used as the image sensor. Under the control of the control unit 101, the imaging unit 102 converts subject light (focused by a lens included in the imaging unit 102) into an electrical signal by using the image sensor, performs noise reduction processing on the electrical signal, and outputs digital data as image data. In the digital camera 100 according to the present exemplary embodiment, the control unit 101 records image data on the recording medium 107 according to the Design Rule for Camera File System (DCF) standard.

The nonvolatile memory 103 is an electrically erasable and recordable nonvolatile memory that stores programs to be executed by the control unit 101.

The work memory 104 is used as a buffer memory for temporarily storing image data captured by the imaging unit 102, an image display memory for the display unit 106, and a work area for the control unit 101.

The operation unit 105 is used to receive an instruction for the digital camera 100 from a user. The operation unit 105 includes switches and buttons used by the user to instruct the digital camera 100 to perform operations, for example, a power switch for turning power ON and OFF, a release switch for capturing an image, a moving image capturing switch for capturing a moving image, and a reproduction button for reproducing image data. The operation unit 105 includes operation members such as a dedicated connection button for starting communication with an external apparatus via the connection unit 108, and a touch panel formed on the display unit 106. The release switch includes SW1 and SW2. SW1 turns ON when the release switch is half-pressed. When SW1 turns ON, the operation unit 105 receives instructions for making imaging preparations of autofocus (AF) processing, automatic exposure (AE) processing, automatic white balance (AWB) processing, and pre-flashing (EF) processing. SW2 turns ON when the release switch is fully pressed. When SW2 turns ON, the operation unit 105 receives an instruction for capturing an image.

Under the control of the control unit 101, the display unit 106 displays a view finder image at the time of image capturing, captured image data, and texts for interactive operations. The display unit 106 does not necessarily need to be integrated with the digital camera 100 and can be provided external to the digital camera 100. The digital camera 100 can be connected with the display unit 106 inside or outside the digital camera 100 and needs to be provided with at least a display control function for controlling display of the display unit 106.

The recording medium 107 can record image data output from the imaging unit 102. The recording medium 107 can be detachably attached to the digital camera 100 or integrated with the digital camera 100. More specifically, the digital camera 100 needs to be provided with at least a means for accessing the recording medium 107.

The connection unit 108 is an interface for connecting with an external apparatus. The digital camera 100 according to the present exemplary embodiment can exchange data with an external apparatus via the connection unit 108. For example, the digital camera 100 can transmit image data generated by the imaging unit 102 to an external apparatus via the connection unit 108. According to the present exemplary embodiment, the connection unit 108 includes an interface for communicating with an external apparatus according to the Institute of Electrical and Electronics Engineers (IEEE) 802.11 standard, i.e., wireless LAN. The control unit 101 performs a wireless communication with an external apparatus by controlling the connection unit 108. Communication methods related to a wireless communication is not limited to wireless LAN, and also include the infrared communication method.

The close-proximity wireless communication unit 109 is, for example, a Bluetooth® wireless communication unit for performing a Bluetooth® communication. The digital camera 100 performs a Bluetooth® communication, via the close-proximity wireless communication unit 109, with the smartphone 200 and the remote control 300, which are other apparatuses serving as external apparatuses.

When the user turns OFF the power switch of the operation unit 105, the digital camera 100 enters the sleep state (second operating state) that consumes less power than the normal state (first operating state). Even when the power switch of the operation unit 105 is ON, when the operation unit 105 is left unoperated, the digital camera 100 automatically enters the sleep state for power saving. In the sleep state, when the digital camera 100 performs a Bluetooth® communication with the smartphone 200 and the remote control 300, and, upon reception of an operation request from the smartphone 200 or the remote control 300, returns from the sleep state to the normal state.

For example, when capturing an image by using the digital camera 100 fixed on a tripod via remote control, the user can put the digital camera 100 in the sleep state by leaving the power switch turned ON. In this state, when the user operates the smartphone 200 or the remote control 300 at an arbitrary timing, the digital camera 100 returns from the sleep state to the normal state and becomes ready for imaging. When the user leaves the digital camera 100 after imaging, the digital camera 100 automatically enters the sleep state again. When the user does not perform image capturing, the digital camera 100 enters the sleep state in this way, preventing unnecessary power consumption.

After turning OFF the power switch of the digital camera 100 to put the digital camera 100 in the sleep state, when the user operate the smartphone 200, for example, with the digital camera 100 stored in a bag, the digital camera 100 can return from the sleep state to the normal state. At this timing, the power switch of the digital camera 100 is OFF, and therefore the digital camera 100 cannot capture an image even if the user returns the digital camera 100 to the normal state and operates the operation unit 105. While the display unit 106 does not display an image, it is possible to display an image on a display unit 206 (described below) of the smartphone 200, for example, by transmitting image data recorded in the recording medium 107 to the smartphone 200. In this case, the user can view images in the digital camera 100 by operating the smartphone 200. Since the digital camera 100 does not display an image on the display unit 106, the digital camera 100 does not consume unnecessary power. In addition, the digital camera 100 does not capture an image even if the user operates the operation unit 105, for example, if the digital camera 100 is unexpectedly operated in a bag.

In the digital camera 100 according to the present exemplary embodiment, operations to be enabled from external apparatuses (the smartphone 200 and the remote control 300) after returning from the sleep state to the normal state differ based on the operation state of the power switch of the operation unit 105. Such operations will be described below with reference to FIG. 2B. As illustrated in FIG. 2B, when the operation state of the power switch is ON, the digital camera 100 (the control unit 101) sets an imaging function (first function) and an image viewing function (second function) as functions to be enabled upon an operation of an external apparatus when the digital camera 100 returns from the sleep state to the normal state. As illustrated in FIG. 2B, when the operation state of a power switch is OFF, the digital camera 100 (the control unit 101) sets the image viewing function (second function) as a function to be enabled upon an operation of an external apparatus when the digital camera 100 returns from the sleep state to the normal state.

<Overall Configuration of Smartphone 200>

Figure 3:
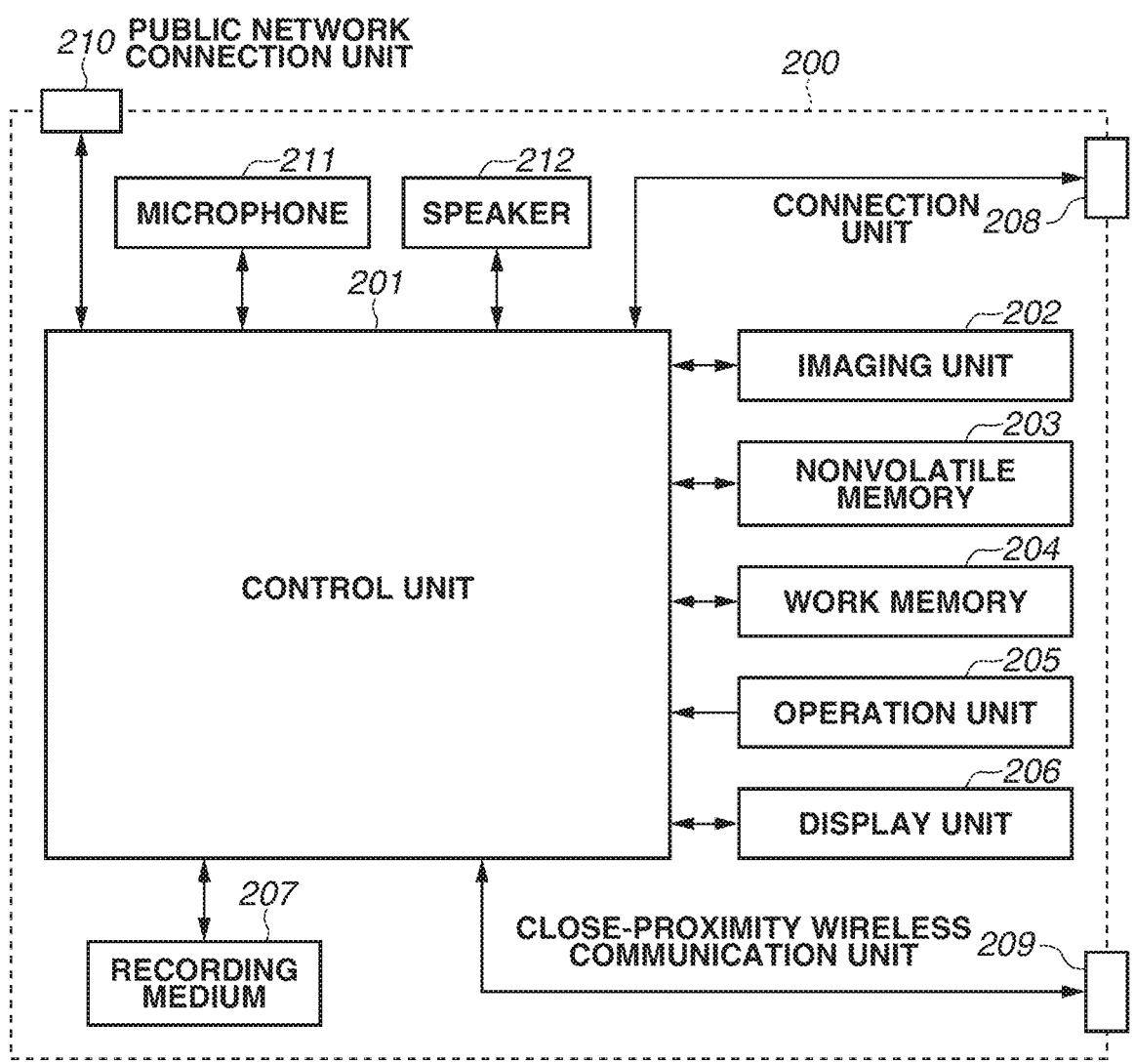
FIG. 3 is a block diagram illustrating an example of an overall configuration of a smartphone illustrated in FIG. 1 according to the exemplary embodiment.

FIG. 3 illustrates an example of an overall configuration of the smartphone 200 illustrated in FIG. 1 according to the exemplary embodiment. While, in the present exemplary embodiment, a smartphone is used as one of the external apparatuses (other apparatuses), the external apparatuses are not limited thereto. For example, an information processing apparatus such as a digital camera with a wireless function, a tablet device, and a personal computer (PC) is also applicable as one of the external apparatuses (other apparatuses).

As illustrated in FIG. 3, the smartphone 200 includes a control unit 201, an imaging unit 202, a nonvolatile memory 203, a work memory 204, an operation unit 205, a display unit 206, a recording medium 207, a connection unit 208, a close-proximity wireless communication unit 209, a public network connection unit 210, a microphone 211, and a speaker 212.

Based on an input signal and a predetermined program, the control unit 201 controls each component of the smartphone 200 to comprehensively control operations of the smartphone 200. Instead of the control unit 201 controlling operations of the smartphone 200, a plurality of hardware components can share processing to control the entire smartphone 200.

Under the control of the control unit 201, the imaging unit 202 converts subject light (focused by a lens included in the imaging unit 202) into an electrical signal, performs noise reduction processing on the electrical signal, and outputs digital data as image data. In the smartphone 200 according to the present exemplary embodiment, the control unit 201 stores the image data in a buffer memory, performs a predetermined calculation on the image data, and records the resultant data in the recording medium 207.

The nonvolatile memory 203 is an electrically erasable and recordable nonvolatile memory that stores an operating system (OS, i.e., basic software executed by the control unit 201) and applications for implementing applied functions in collaboration with the OS. According to the present exemplary embodiment, the nonvolatile memory 203 stores an application for communicating with the digital camera 100.

The work memory 204 is used as an image display memory for the display unit 206 and a work area for the control unit 201.

The operation unit 205 is used to receive an instruction for the smartphone 200 from the user. The operation unit 205 includes operation members such as a power switch for turning power of the smartphone 200 ON and OFF and a touch panel formed on the display unit 206.

Under the control of the control unit 201, the display unit 206 displays image data and texts for an interactive operation. The display unit 206 does not necessarily need to be integrated with the smartphone 200 and can be provided external to the smartphone 200. The smartphone 200 can be connected with the display unit 206 inside or outside the smartphone 200 and needs to be provided with at least a display control function for controlling display of the display unit 206.

The recording medium 207 can record image data output from the imaging unit 202. The recording medium 207 can be detachably attached to the smartphone 200 integrated with the smartphone 200. More specifically, the smartphone 200 needs to be provided with at least a means for accessing the recording medium 207.

The connection unit 208 is an interface for connecting with an external apparatus. The smartphone 200 according to the present exemplary embodiment can exchange data with the digital camera 100 via the connection unit 208. According to the present exemplary embodiment, for example, the connection unit 208 is an antenna, and the control unit 201 can establish a communication connection with the digital camera 100 via the antenna. In the communication connection with the digital camera 100, the smartphone 200 can be directly connected with the digital camera 100 or indirectly connected via an access point. In this case, for example, Picture Transfer Protocol over Internet Protocol (PTP/IP) via a wireless LAN can be used as a protocol for data communication. However, the communication connection between the smartphone 200 and the digital camera 100 is not limited thereto. For example, the connection unit 208 can include a wireless communication module such as an infrared communication module and a wireless universal serial bus (USB). Cable connection through USB, High-Definition Multimedia Interface (HDMI®), or IEEE 1394 can be employed for communication connection between the smartphone 200 and the digital camera 100.

The close-proximity wireless communication unit 209 is, for example, a Bluetooth® wireless communication unit for performing a Bluetooth® communication. The smartphone 200 performs a Bluetooth® communication with the digital camera 100 via the close-proximity wireless communication unit 209. In this case, the smartphone 200 according to the present exemplary embodiment is an apparatus that performs the imaging function (first function) and the image viewing function (second function) upon an operation by transmitting an operation request to the digital camera 100 via a Bluetooth® communication. Then, the smartphone 200 can employ a mode for displaying an imaging button on the display unit 206 during an imaging operation, receiving an image from the digital camera 100 and displaying the received image on the display unit 206 during an image viewing operation.

The public network connection unit 210 is an interface used for a public wireless communication. The smartphone 200 makes phone calls via the public network connection unit 210. In this case, the control unit 201 makes phone calls by inputting and outputting audio signals via the microphone 211 and the speaker 212, respectively. According to the present exemplary embodiment, for example, the public network connection unit 210 is an antenna, and the control unit 201 can connect with a public network through the antenna. The connection unit 208 and the public network connection unit 210 can be implemented as one antenna.

<Overall Configuration of Remote Control 300>

Figure 4:
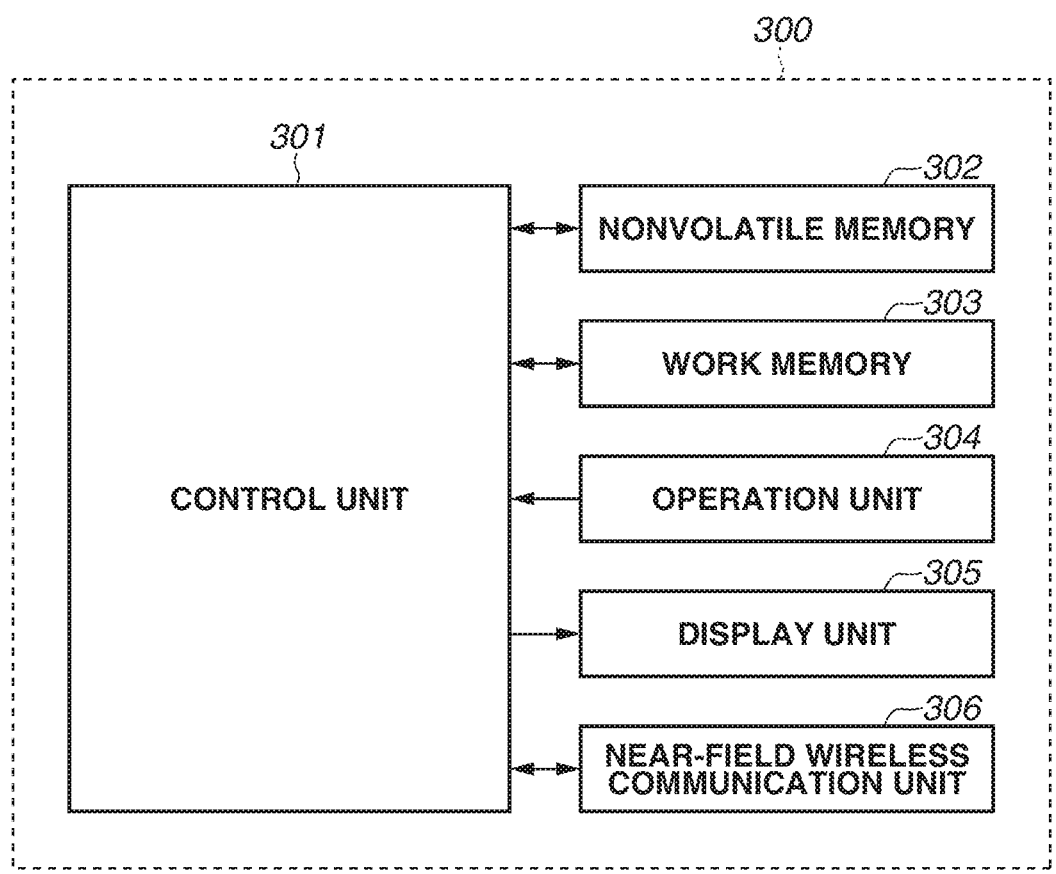
FIG. 4 is a block diagram illustrating an example of an overall configuration of a remote control illustrated in FIG. 1 according to the exemplary embodiment.

FIG. 4 illustrates an example of an overall configuration of the remote control 300 illustrated in FIG. 1 according to an exemplary embodiment. While, in the present exemplary embodiment, a remote control is used as one of the external apparatuses (other apparatuses), an external apparatus is not limited thereto.

As illustrated in FIG. 4, the remote control 300 includes a control unit 301, a nonvolatile memory 302, a work memory 303, an operation unit 304, a display unit 305, and a near-field wireless communication unit 306.

According to an input signal and a predetermined program, the control unit 301 controls each component of the remote control 300 to comprehensively control operations of the remote control 300. Instead of the control unit 301 controlling operations of the remote control 300, a plurality of hardware components can share processing to control the entire remote control 301.

The nonvolatile memory 302 is an electrically erasable and recordable nonvolatile memory that stores programs to be executed by the control unit 301.

The work memory 303 is used as a work area for the control unit 301.

The operation unit 304 is used to receive an instruction for the remote control 300 from the user. The operation unit 304 includes operation members such as a release button for instructing the digital camera 100 to perform an imaging operation, an AF button for instructing the digital camera 100 to perform an AF operation, and a Wide button and a Tele button for instructing the digital camera 100 to drive a zoom lens.

The display unit 305 is a display device such as a light emitting diode (LED). For example, when the remote control 300 receives an operation on the operation unit 304 by the user, transmits an operation request to the digital camera 100, and then receives a response for the request, the display unit 305 displays that the digital camera 100 has operated. For example, the display unit 305 blinks when the user operates the AF button of the operation unit 304, the remote control 300 transmits an AF request to the digital camera 100, the digital camera 100 performs an AF operation, and then the remote control 300 receives a focusing signal as a response from the digital camera 100.

The near-field wireless communication unit 306 is, for example, a Bluetooth® wireless communication unit for performing a Bluetooth® communication. The remote control 300 performs a Bluetooth® communication with the digital camera 100 via the near-field wireless communication unit 306. In this case, the remote control 300 according to the present exemplary embodiment is an apparatus that performs the imaging function (first function), upon an operation, by transmitting an operation request to the digital camera 100 via a Bluetooth® communication.

<Sequence in which Digital Camera 100 Returns from Sleep State to Normal State>

The following describes a sequence in which the digital camera 100 returns from the sleep state to the normal state when the user operates the smartphone 200 or the remote control 300 as an external apparatus (another apparatus) while the digital camera 100 is in the sleep state. In this case, a Bluetooth® communication connection between the digital camera 100 and the external apparatus (another apparatus) is established or disconnected. Possible cases where a Bluetooth® communication connection is disconnected include a case where power of the external apparatus (another apparatus) is OFF, a case where the Bluetooth® function of the external apparatus (another apparatus) is disabled, and a case where the digital camera 100 is remote from the external apparatus (another apparatus).

FIG. 5 illustrates an example of a sequence in which the digital camera 100 returns from the sleep state to the normal state when the user operates the smartphone 200 while the digital camera (communication apparatus) 100 illustrated in FIG. 1 is in the sleep state. FIG. 5 illustrates a state where a Bluetooth® communication connection between the digital camera 100 and the smartphone 200 is disconnected when the sequence is started.

In step S501, the control unit 101 of the digital camera 100 sets the operating state of the digital camera 100 to the sleep state.

In step S502, the control unit 101 of the digital camera 100 transmits an advertise packet to the smartphone 200 via the close-proximity wireless communication unit 109.

In step S503, the control unit 201 of the smartphone 200 receives the advertise packet transmitted via the close-proximity wireless communication unit 209 in step S502, and confirms the contents of the advertise packet. More specifically, in step S503, the control unit 201 of the smartphone 200 confirms whether a Bluetooth® communication connection is possible based on the contents of the advertise packet. In step S503, when the control unit 201 of the smartphone 200 confirms that a Bluetooth® communication connection is possible (YES in step S503), the processing proceeds to step S504.

In step S504, the control unit 201 of the smartphone 200 transmits a Bluetooth® communication connection request to the digital camera 100 via the close-proximity wireless communication unit 209.

In step S505, the control unit 101 of the digital camera 100 receives the connection request transmitted in step S504 via the close-proximity wireless communication unit 109, and performs connection processing for a Bluetooth® communication with the smartphone 200.

When the user operates the operation unit 205 of the smartphone 200 in a state where the digital camera 100 and the smartphone 200 have established a Bluetooth® communication connection through the connection processing, in step S506, the control unit 201 of the smartphone 200 detects the operation.

Upon detection of the operation in step S506, in step S507, the control unit 201 of the smartphone 200 transmits an operation request to the digital camera 100 via the close-proximity wireless communication unit 209.

In step S508, via the close-proximity wireless communication unit 109, the control unit 101 of the digital camera 100 receives the operation request transmitted in step S507. Then, the control unit 101 of the digital camera 100 performs setting for returning the operating state of the digital camera 100 from the sleep state to the normal state.

FIG. 6 illustrates an example of a sequence in which the digital camera 100 returns from the sleep state to the normal state when the user operates the smartphone 200 while the digital camera (communication apparatus) 100 illustrated in FIG. 1 is in the sleep state. FIG. 6 illustrates a state where the digital camera 100 and the smartphone 200 have established a Bluetooth® communication connection when the sequence is started.

In step S601, the control unit 101 of the digital camera 100 sets the operating state of the digital camera 100 to the sleep state.

In step S602, the control unit 101 of the digital camera 100 maintains the Bluetooth® communication connection with the smartphone 200.

When the user operates the operation unit 205 of the smartphone 200 in this connection state, in step S603, the control unit 201 of the smartphone 200 detects the operation.

Upon detection of the operation in step S603, in step S604, the control unit 201 of the smartphone 200 transmits an operation request to the digital camera 100 via the close-proximity wireless communication unit 209.

In step S605, via the close-proximity wireless communication unit 109, the control unit 101 of the digital camera 100 receives the operation request transmitted from the smartphone 200 in step S604. Then, the control unit 101 of the digital camera 100 performs setting for returning the operating state of the digital camera 100 from the sleep state to the normal state.

FIG. 7 illustrates an example of a sequence in which the digital camera 100 returns from the sleep state to the normal state when the user operates the remote control 300 while the digital camera (communication apparatus) 100 illustrated in FIG. 1 is in the sleep state. FIG. 7 illustrates a state where a Bluetooth® communication connection between the digital camera 100 and the remote control 300 is disconnected when the sequence is started.

In step S701, the control unit 101 of the digital camera 100 sets the operating state of the digital camera 100 to the sleep state.

In step S702, the control unit 101 of the digital camera 100 transmits an advertise packet to the remote control 300 via the close-proximity wireless communication unit 109.

When the user operates the operation unit 304 of the remote control 300, in step S703, the control unit 301 of the remote control 300 detects the operation.

In step S704, the control unit 301 of the remote control 300 receives the advertise packet transmitted via the near-field wireless communication unit 306 in step S702, and confirms the contents of the advertise packet. More specifically, in step S704, the control unit 301 of the remote control 300 confirms whether a Bluetooth® communication connection is possible based on the contents of the advertise packet. When the control unit 301 of the remote control 300 confirms that a Bluetooth® communication connection is possible (YES in step S704), the processing proceeds to step S705.

In step S705, the control unit 301 of the remote control 300 transmits a Bluetooth® communication connection request to the digital camera 100 via the near-field wireless communication unit 306.

In step S706, via the close-proximity wireless communication unit 109, the control unit 101 of the digital camera 100 receives the connection request transmitted in step S705, and performs connection processing for a Bluetooth® communication with the remote control 300.

When the user operates the operation unit 304 of the remote control 300 in a state where the digital camera 100 and the remote control 300 have established a Bluetooth® communication connection through this connection processing, in step S703, the control unit 301 of the remote control 300 detects the operation. Upon detection of the operation in step S703, in step S707, the control unit 301 of the remote control 300 transmits an operation request to the digital camera 100 via the near-field wireless communication unit 306.

In step S708, via the close-proximity wireless communication unit 109, the control unit 101 of the digital camera 100 receives the operation request transmitted from the remote control 300 in step S707. Then, the control unit 101 of the digital camera 100 performs setting for returning the operating state of the digital camera 100 from the sleep state to the normal state.

When the user operates the remote control 300 as a trigger in this way, the remote control 300 establishes communication via the near-field wireless communication unit 306 and transmits an operation request via the established communication. Then, the digital camera 100 is activated.

<Flowchart of Method for Controlling Digital Camera 100>

Figure 8A:
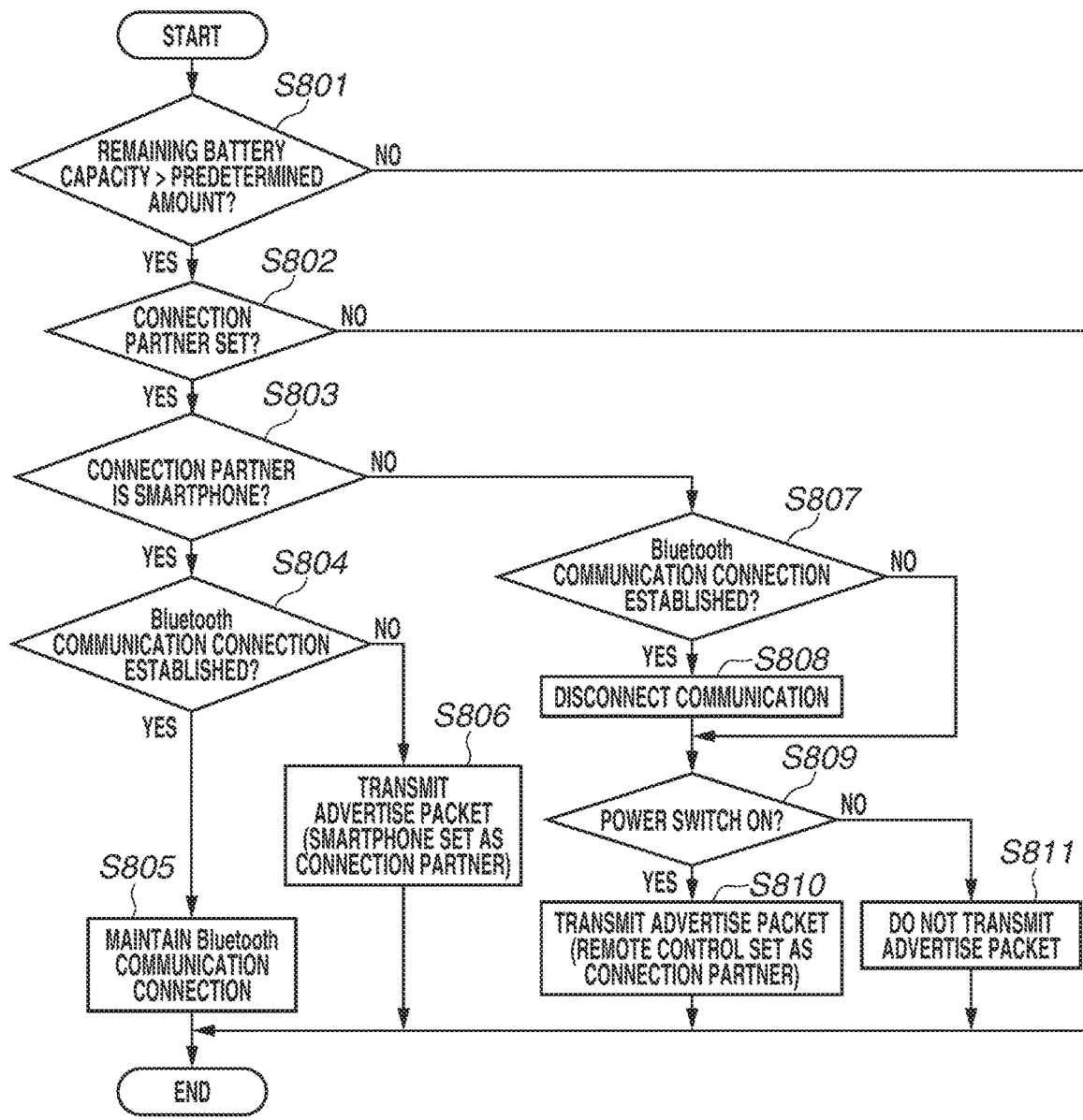
FIGS. 8A and 8B are flowcharts illustrating an example of a processing procedure in a control method for the digital camera (communication apparatus) according to the exemplary embodiment.
Figure 8B:
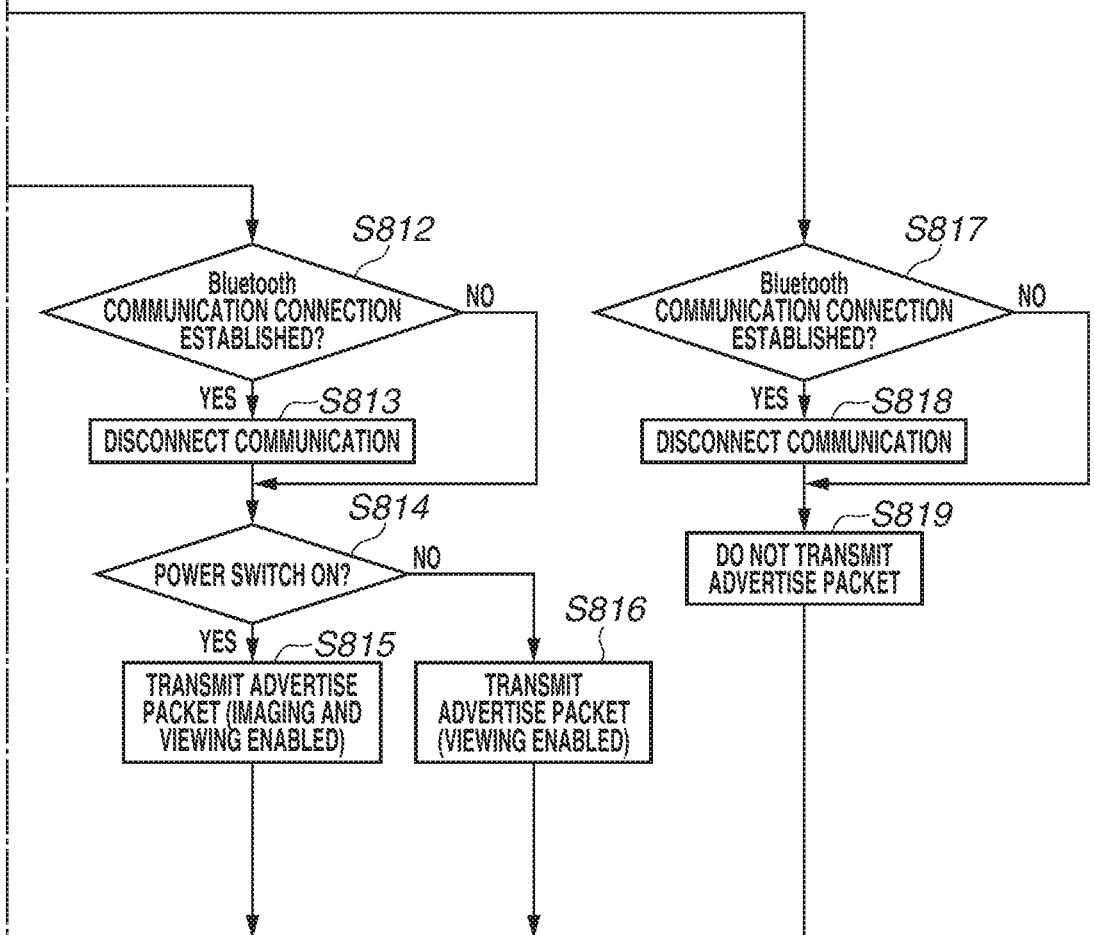

FIGS. 8A and 8B are flowcharts illustrating an example of a processing procedure in a control method for the digital camera (communication apparatus) 100 according to the exemplary embodiment. More specifically, FIGS. 8A and 8B illustrate a state where the digital camera 100 enters the sleep state.

In step S801, the control unit 101 of the digital camera 100 determines whether the remaining battery capacity is greater than a predetermined amount.

When the control unit 101 of the digital camera 100 determines that the remaining battery capacity is greater than the predetermined amount (YES in step S801), the processing proceeds to step S802.

In step S802, the control unit 101 of the digital camera 100 determines whether a wireless communication connection partner is set. According to the present exemplary embodiment, a case where a connection partner is set is a case where either the smartphone 200 or the remote control 300 is set as an apparatus with which the control unit 101 performs Bluetooth® communication when the user operates the operation unit 105.

According to the present exemplary embodiment, when the control unit 101 of the digital camera 100 sets the smartphone 200 as a connection partner, the digital camera 100 establishes a Bluetooth® communication connection only with the smartphone 200. Likewise, according to the present exemplary embodiment, when the control unit 101 of the digital camera 100 sets the remote control 300 as a connection partner, the digital camera 100 establishes a Bluetooth® communication connection only with the remote control 300. According to the present exemplary embodiment, the digital camera 100 can establish a Bluetooth® communication connection with an external apparatus other than the smartphone 200 and the remote control 300 without setting a connection partner. In this case, the digital camera 100 employs a mode in which the digital camera 100 establishes a Bluetooth® communication connection with the smartphone 200 or the remote control 300, whichever transmits a Bluetooth® communication connection request first.

When the control unit 101 of the digital camera 100 determines that a wireless communication connection partner is set (YES in step S802), the processing proceeds to step S803.

In step S803, the control unit 101 of the digital camera 100 determines whether a wireless communication connection partner is the smartphone 200.

When the control unit 101 of the digital camera 100 determines that the wireless communication connection partner is the smartphone 200 (YES in step S803), the processing proceeds to step S804.

In step S804, the control unit 101 of the digital camera 100 determines whether a Bluetooth® communication connection has been established with the smartphone 200, which is a wireless communication connection partner.

When the control unit 101 of the digital camera 100 determines that a Bluetooth® communication connection has been established with the smartphone 200 as a wireless communication connection partner (YES in step S804), the processing proceeds to step S805.

In step S805, the control unit 101 of the digital camera 100 maintains a Bluetooth® communication connection with the smartphone 200 as a wireless communication connection partner. Then, the processing of FIG. 8A ends.

When the control unit 101 of the digital camera 100 determines that a Bluetooth® communication connection has not been established with the smartphone 200 as a wireless communication connection partner (NO in step S804), the processing proceeds to step S806.

In step S806, via the close-proximity wireless communication unit 109, the control unit 101 of the digital camera 100 transmits an advertise packet in which the smartphone 200 is set as a connection partner. Then, the processing of FIG. 8A ends.

The advertise packet transmitted by the digital camera 100 in step S806 will be described below.

FIGS. 9A to 9D illustrate example structures of advertise packets transmitted from the digital camera (communication apparatus) 100 according to the exemplary embodiment to external apparatuses. For example, the control unit 101 of the digital camera 100 sets connection partner's information in the structure of advertise packets 910 and 920. As illustrated in FIGS. 9A to 9D, the control unit 101 changes the value of the connection partner's information based on whether the connection partner is the smartphone 200, the remote control 300, or no connection partner is set.

When the smartphone 200 is set as a connection partner of the digital camera 100, the control unit 101 of the digital camera 100 transmits the advertise packet 910 including the structure illustrated in FIG. 9A. More specifically, in step S806 illustrated in FIG. 8, the control unit 101 transmits, for example, the advertise packet 910 including the structure illustrated in FIG. 9A in which the smartphone 200 is set as a connection partner. When the smartphone 200 receives the advertise packet 910 including the structure illustrated in FIG. 9A, the smartphone 200 recognizes, based on the advertise packet 910, that the smartphone 200 is set as a connection partner in the digital camera 100 and that a Bluetooth® communication connection is possible. After the digital camera 100 enters the sleep state, the digital camera 100 can establish a Bluetooth® communication connection with the smartphone 200. When the remote control 300 receives the advertise packet 910 including the structure illustrated in FIG. 9A, the remote control 300 recognizes that the smartphone 200 is set as a connection partner in the digital camera 100 and that a Bluetooth® communication connection is not possible.

When the power switch of the digital camera 100 is ON, operating the smartphone 200 enables the digital camera 100 to return from the sleep state to the normal state and receive an imaging request and an image viewing request from the smartphone 200 after returning to the normal state, as illustrated in FIG. 2B. When the power switch of the digital camera 100 is OFF, operating the smartphone 200 enables the digital camera 100 to return from the sleep state to the normal state and receive an image viewing request from the smartphone 200 after returning to the normal state, as illustrated in FIG. 2B.

Returning to the processing illustrated in FIG. 8A, when the control unit 101 of the digital camera 100 determines that the wireless communication connection partner is the remote control 300 and not the smartphone 200 (NO in step S803), the processing proceeds to step S807.

In step S807, the control unit 101 of the digital camera 100 determines whether a Bluetooth® communication connection has been established with the remote control 300, which is a wireless communication connection partner.

In step S807, when the control unit 101 of the digital camera 100 determines that a Bluetooth® communication connection has been established with the remote control 300 as a wireless communication connection partner (YES in step S807), the processing proceeds to step S808.

In step S808, the control unit 101 of the digital camera 100 disconnects the Bluetooth® communication with the remote control 300. To restrict the power consumption of the remote control 300, the control unit 101 disconnects the Bluetooth® communication when the digital camera 100 enters the sleep state.

When the control unit 101 of the digital camera 100 determines that a Bluetooth® communication connection has not been established with the remote control 300 (NO in step S807) or when the processing in step S808 is completed, the processing proceeds to step S809.

In step S809, the control unit 101 of the digital camera 100 determines whether the power switch of the operation unit 105 is ON.

In step S809, when the control unit 101 of the digital camera 100 determines that the power switch of the operation unit 105 is ON (YES in step S809), the processing proceeds to step S810.

In step S810, via the close-proximity wireless communication unit 109, the control unit 101 of the digital camera 100 transmits an advertise packet in which the remote control 300 is set as a connection partner. Then, the processing of FIG. 8A ends.

The advertise packet transmitted by the digital camera 100 in step S810 will now be described.

When the remote control 300 is set as a connection partner of the digital camera 100, the control unit 101 of the digital camera 100 transmits the advertise packet 910 including the structure illustrated in FIG. 9B. More specifically, in step S810, the control unit 101 transmits, for example, the advertise packet 910 including the structure illustrated in FIG. 9B in which the remote control 300 is set as a connection partner. When the remote control 300 receives the advertise packet 910 including the structure illustrated in FIG. 9B, the remote control 300 recognizes, based on the advertise packet 910, that the remote control 300 is set as a connection partner in the digital camera 100 and that a Bluetooth® communication connection is possible. After the digital camera 100 enters the sleep state, the digital camera 100 can establish a Bluetooth® communication connection with the remote control 300.

When the smartphone 200 receives the advertise packet 910 including the structure illustrated in FIG. 9B, the smartphone 200 recognizes that the remote control 300 is set as a connection partner in the digital camera 100 and that a Bluetooth® communication connection is not possible. When the power switch of the digital camera 100 is ON, operating the remote control 300 enables the digital camera 100 to return from the sleep state to the normal state and receive an imaging request from the remote control 300 after returning to the normal state, as illustrated in FIG. 2B.

Returning to the processing illustrated in FIG. 8A, when the control unit 101 of the digital camera 100 determines that the power switch of the operation unit 105 is not ON (i.e., the power switch is OFF) (NO in step S809), the processing proceeds to step S811.

In step S811, the control unit 101 of the digital camera 100 performs processing to not transmit an advertise packet in which the remote control 300 is set as a connection partner. In this case, since the power switch of the operation unit 105 is OFF, the digital camera 100 is unable to capture an image even upon receipt of an imaging request from the remote control 300 after returning from the sleep state to the normal state, as illustrated in FIG. 2B. Therefore, the control unit 101 does not transmit the advertise packet. As a result, the digital camera 100 does not establish a Bluetooth® communication connection with the remote control 300. Accordingly, the digital camera 100 does not return from the sleep state to the normal state when the user operates the remote control 300. Upon completion of the processing in step S811, the processing of FIG. 8A ends.

When the control unit 101 of the digital camera 100 determines that no wireless communication connection partner is set (NO in step S802), the processing proceeds to step S812 in FIG. 8B.

In step S812, the control unit 101 of the digital camera 100 determines whether a Bluetooth® communication connection has been established with the smartphone 200 or the remote control 300.

When the control unit 101 of the digital camera 100 determines that a Bluetooth® communication connection has been established with the smartphone 200 or the remote control 300 (YES in step S812), the processing proceeds to step S813.

In step S813, the control unit 101 of the digital camera 100 disconnects the Bluetooth® communication.

When the control unit 101 of the digital camera 100 determines that a Bluetooth® communication connection has not been established with the smartphone 200 or the remote control 300 (NO in step S812) or when the processing in step S813 is completed, the processing proceeds to step S814.

In step S814, the control unit 101 of the digital camera 100 determines whether the power switch of the operation unit 105 is ON.

In step S814, when the control unit 101 of the digital camera 100 determines that the power switch of the operation unit 105 is ON (YES in step S814), the processing proceeds to step S815.

In step S815, via the close-proximity wireless communication unit 109, the control unit 101 of the digital camera 100 transmits an advertise packet in which the imaging function and image viewing function are set as functions to be enabled upon an operation of an external apparatus. More specifically, in this case, the digital camera 100 notifies (informs) that the digital camera 100 supports both the imaging function and the image viewing function. Then, the processing of FIG. 8B ends.

The advertise packet transmitted by the digital camera 100 in step S815 will be described below.

When no connection partner of the digital camera 100 is set and the imaging function and image viewing function are set as functions to be enabled upon an operation of an external apparatus, the control unit 101 of the digital camera 100 transmits the advertise packet 920 including the structure illustrated in FIG. 9C. More specifically, referring to FIG. 9C, the structure of the advertise packet 920 includes an imaging enable bit and a viewing enable bit as information about the functions to be enabled upon an operation of an external apparatus, and both bits are set to ON (1). More specifically, in step S815, the control unit 101 transmits, for example, the advertise packet 920 including the structure illustrated in FIG. 9C in which the imaging function and image viewing function are set as functions to be enabled upon an operation of an external apparatus. When the smartphone 200 and the remote control 300 receive the advertise packet 920 including the structure illustrated in FIG. 9C, the smartphone 200 and the remote control 300 recognize that no connection partner is set in the digital camera 100 and that the imaging function and image viewing function are enabled upon an operation of an external apparatus.

In this case, the smartphone 200 recognizes that a Bluetooth® communication connection is possible since the smartphone 200 supports both the imaging function and the image viewing function, as described above, and both the imaging enable bit and the viewing enable bit are ON in the advertise packet 920 illustrated in FIG. 9C. The remote control 300 recognizes that a Bluetooth® communication connection is possible since the remote control 300 supports only the imaging function, as described above, and the imaging enable bit is ON in the advertise packet 920 illustrated in FIG. 9C.

Returning to the processing illustrated in FIG. 8B, when the control unit 101 of the digital camera 100 determines that the power switch of the operation unit 105 is not ON (i.e., the power switch is OFF) (NO in step S814), the processing proceeds to step S816.

In step S816, via the close-proximity wireless communication unit 109, the control unit 101 of the digital camera 100 transmits an advertise packet in which the image viewing function is set as a function to be enabled upon an operation of an external apparatus. More specifically, the digital camera 100 notifies (informs) that the digital camera 100 supports only the image viewing function. Then, the processing of FIG. 8B ends.

The advertise packet transmitted by the digital camera 100 in step S816 will be described below.

When no connection partner of the digital camera 100 is set and only the image viewing function is set as a function to be enabled upon an operation of an external apparatus, the control unit 101 of the digital camera 100 transmits an advertise packet 920 including the structure illustrated in FIG. 9D. More specifically, referring to FIG. 9D, the imaging enable bit and the viewing enable bit are provided in the structure of the advertise packet 920 as information about the functions to be enabled upon an operation of an external apparatus, and the imaging enable bit is set to OFF (0) and the viewing enable bit is set to ON (1). More specifically, in step S816, the control unit 101 transmits the advertise packet 920 including the structure illustrated in FIG. 9D in which only the image viewing function is set as a function to be enabled upon an operation of an external apparatus. When the smartphone 200 and the remote control 300 receive the advertise packet 920 including the structure illustrated in FIG. 9D, the smartphone 200 and the remote control 300 recognize that no connection partner is set in the digital camera 100 and that only the image viewing function is enabled upon an operation of an external apparatus.

In this case, the smartphone 200 supports both the imaging function and the image viewing function, as described above, and that a Bluetooth® communication connection is possible since the viewing enable bit is ON in the advertise packet 920 illustrated in FIG. 9D. The remote control 300 recognizes that a Bluetooth® communication connection is not possible since the remote control 300 supports only the imaging function (i.e., the remote control 300 does not support the image viewing function), as described above, and that only the viewing enable bit is ON in the advertise packet 920 illustrated in FIG. 9D.

The advertise packet 920 illustrated in FIGS. 9C and 9D indicates an example of using the imaging enable bit and the viewing enable bit as information about the functions supported by the digital camera 100. However, for example, a smartphone enable bit and a remote control enable bit can be provided. In this case, when the power switch is OFF, the smartphone enable bit can be set to ON and the remote control enable bit can be set to OFF. In this case, the remote control 300 recognizes that a Bluetooth® communication connection with the digital camera 100 is not possible.

Returning to the processing of the flowchart in FIG. 8A, when the control unit 101 of the digital camera 100 determines that the remaining battery capacity is not greater than a predetermined amount (i.e., the remaining battery capacity is less than or equal to the predetermined amount) (NO in step S801), the processing proceeds to step S817 in FIG. 8B.

In step S817, the control unit 101 of the digital camera 100 determines whether a Bluetooth® communication connection has been established with the smartphone 200 or the remote control 300.

When the control unit 101 of the digital camera 100 determines that a Bluetooth® communication connection has been established with the smartphone 200 or the remote control 300 (YES in step S817), the processing proceeds to step S818.

In step S818, the control unit 101 of the digital camera 100 disconnects the Bluetooth® communication.

When the control unit 101 of the digital camera 100 determines that a Bluetooth® communication connection has not been established with the smartphone 200 or the remote control 300 (NO in step S817) or when the processing in step S818 is completed, the processing proceeds to step S819.

In step S819, the control unit 101 of the digital camera 100 performs processing to not transmit an advertise packet. Since the remaining battery capacity is less than or equal to the predetermined amount, the digital camera 100 is unable to perform the imaging operation even if the user operates the operation unit 105 of the digital camera 100. The digital camera 100 is also unable to display captured image data on the display unit 106. Therefore, even if the user operates the smartphone 200 or the remote control 300 to return the digital camera 100 from the sleep state to the normal state, the digital camera 100 is unable to perform any operation, resulting in useless power consumption. For this reason, the digital camera 100 employs a mode in which, when the remaining battery capacity is less than or equal to the predetermined amount, the control unit 101 of the digital camera 100 does not perform Bluetooth® communication with the smartphone 200 and the remote control 300, and does not enable the digital camera 100 to return from the sleep state to the normal state.

<Flowchart of Method for Controlling Smartphone 200>

FIG. 10 is a flowchart illustrating an example of a processing procedure in a control method for the smartphone 200 according to the exemplary embodiment. More specifically, FIG. 10 is a flowchart illustrating processing in which the smartphone 200 establishes a Bluetooth® communication connection with the digital camera 100 in the sleep state.

In step S1001, the control unit 201 of the smartphone 200 determines whether a Bluetooth® communication connection has been established with the digital camera 100. When the control unit 201 of the smartphone 200 determines that a Bluetooth® communication connection has been established with the digital camera 100 (YES in step S1001), the processing ends.

When the control unit 201 of the smartphone 200 determines that a Bluetooth® communication connection has not been established with the digital camera 100 (NO in step S1001), the processing proceeds to step S1002.

In step S1002, the control unit 201 of the smartphone 200 determines whether an advertise packet is received from the digital camera 100.

When the control unit 201 of the smartphone 200 determines that an advertise packet is received from the digital camera 100 (YES in step S1002), the processing proceeds to step S1003.

In step S1003, the control unit 201 of the smartphone 200 determines whether a wireless communication connection partner is set in the received advertise packet.

When the control unit 201 of the smartphone 200 determines that a wireless communication connection partner is set in the received advertise packet (YES in step S1003), the processing proceeds to step S1004.

In step S1004, the control unit 201 of the smartphone 200 determines whether the connection partner set in the received advertise packet is the smartphone 200 itself.

When the control unit 201 of the smartphone 200 determines that the connection partner set in the received advertise packet is the smartphone 200 itself (YES in step S1004), the processing proceeds to step S1005.

In step S1005, the control unit 201 of the smartphone 200 transmits a Bluetooth® communication connection request to the digital camera 100 via the close-proximity wireless communication unit 209. Then, the processing ends.

When the control unit 201 of the smartphone 200 determines that the connection partner set in the received advertise packet is not the smartphone 200 itself (NO in step S1004), the processing proceeds to step S1006.

In step S1006, the control unit 201 of the smartphone 200 performs processing to not transmit a Bluetooth® communication connection request to the digital camera 100. Then, the processing ends.

When the control unit 201 of the smartphone 200 determines that no wireless communication connection partner is set in the received advertise packet (NO in step S1003), the processing proceeds to step S1007.

In step S1007, the control unit 201 of the smartphone 200 determines whether the functions (supported functions) enabled upon an operation of the external apparatus set in the received advertise packet are the imaging function and image viewing function.

When the control unit 201 of the smartphone 200 determines that the supported functions set in the received advertise packet are the imaging function and image viewing function (YES in step S1007), the processing proceeds to step S1008.

In step S1008, the control unit 201 of the smartphone 200 transmits a Bluetooth® communication connection request to the digital camera 100 via the close-proximity wireless communication unit 209. This is because the smartphone 200 supports both the imaging function and the image viewing function. Then, the processing ends.

When the control unit 201 of the smartphone 200 determines that the supported functions set in the received advertise packet are not both the imaging function and the image viewing function (i.e., only the image viewing function is supported) (NO in step S1007), the processing proceeds to step S1009.

In step S1009, the control unit 201 of the smartphone 200 transmits a Bluetooth® communication connection request to the digital camera 100 via the close-proximity wireless communication unit 209. This is because the smartphone 200 supports the image viewing function. Then, the processing ends.

When the control unit 201 of the smartphone 200 determines that an advertise packet is not received from the digital camera 100 (NO in step S1002), the processing proceeds to step S1010.

In step S1010, the control unit 201 of the smartphone 200 performs processing to not transmit a Bluetooth® communication connection request to the digital camera 100. Then, the processing ends.

In the flowchart illustrated in FIG. 10, when the Bluetooth® function of the smartphone 200 is enabled, the control unit 201 of the smartphone 200 repeats the above-described connection processing for a Bluetooth® communication.

<Flowchart of Method for Controlling Remote Control 300>

FIG. 11 is a flowchart illustrating an example of a processing procedure in a control method for the remote control 300 according to the exemplary embodiment. More specifically, FIG. 11 is a flowchart illustrating processing in which the remote control 300 establishes a Bluetooth® communication connection with the digital camera 100 in the sleep state.

When the user operates the operation unit 304 of the remote control 300, in step S1101, the control unit 301 of the remote control 300 determines whether an advertise packet is received from the digital camera 100.

When the control unit 301 of the remote control 300 determines that an advertise packet is received from the digital camera 100 (YES in step S1101), the processing proceeds to step S1102.

In step S1102, the control unit 301 of the remote control 300 determines whether a wireless communication connection partner is set in the received advertise packet.

When the control unit 301 of the remote control 300 determines that a wireless communication connection partner is set in the received advertise packet (YES in step S1102), the processing proceeds to step S1103.

In step S1103, the control unit 301 of the remote control 300 determines whether the connection partner set in the received advertise packet is the remote control 300 itself.

When the control unit 301 of the remote control 300 determines that the connection partner set in the received advertise packet is the remote control 300 itself (YES in step S1103), the processing proceeds to step S1104.

In step S1104, the control unit 301 of the remote control 300 transmits a Bluetooth® communication connection request to the digital camera 100 via the near-field wireless communication unit 306. Then, the processing ends.

When the control unit 301 of the remote control 300 determines that the connection partner set in the received advertise packet is not the remote control 300 itself (NO in step S1103), the processing proceeds to step S1105.

In step S1105, the control unit 301 of the remote control 300 performs processing to not transmit a Bluetooth® communication connection request to the digital camera 100. Then, the processing ends.

When the control unit 301 of the remote control 300 determines that no wireless communication connection partner is set in the received advertise packet (NO in step S1102), the processing proceeds to step S1106.

In step S1106, the control unit 301 of the remote control 300 determines whether the functions (supported functions) enabled upon an operation of the external apparatus set in the received advertise packet are the imaging function and image viewing function.

When the control unit 301 of the remote control 300 determines that the supported functions set in the received advertise packet are the imaging function and image viewing function (YES in step S1106), the processing proceeds to step S1107.

In step S1107, the control unit 301 of the remote control 300 transmits a Bluetooth® communication connection request to the digital camera 100 via the near-field wireless communication unit 306. This is because the remote control 300 supports the imaging function. Then, the processing ends.

When the control unit 301 of the remote control 300 determines that the supported functions set in the received advertise packet are not both the imaging function and the image viewing function (i.e., only the image viewing function is supported) (NO in step S1106), the processing proceeds to step S1108.

In step S1108, the control unit 301 of the remote control 300 performs processing to not transmit a Bluetooth® communication connection request to the digital camera 100. This is because the remote control 300 does not support the image viewing function. Then, the processing ends.

When the control unit 301 of the remote control 300 determines that an advertise packet is not received from the digital camera 100 (NO in step S1101), the processing proceeds to step S1109.

In step S1109, the control unit 301 of the remote control 300 performs processing to not transmit a Bluetooth® communication connection request to the digital camera 100. Then, the processing ends.

In the digital camera (communication apparatus) 100 according to the present exemplary embodiment, the control unit 101 sets as an operating state of the digital camera 100 the normal state (first operating state) or the sleep state (second operating state), which provides less power consumption than the normal state. The control unit 101, which performs this setting, configures a first setting unit.

As illustrated in FIG. 2B, the control unit 101 sets the function to be enabled upon an operation of the external apparatus (another apparatus) when the digital camera 100 returns from the sleep state to the normal state based on the operation state (ON/OFF) of the power switch of the operation unit 105. The control unit 101, which performs this setting, configures a second setting unit.

When another apparatus as a wireless communication target is an apparatus that is unable to perform, through an operation, the functions set as illustrated in FIG. 2B, the control unit 101 performs control not to perform a wireless communication with the other apparatus (more specifically, the control unit 101 does not perform connection processing for a wireless communication with the other apparatus, i.e., the control unit 101 does not transmit an advertise packet).

The above-described configuration enables preventing the digital camera (communication apparatus) 100 that performs a wireless communication with another apparatus from performing useless wireless communication with the other apparatus. For example, when the operation state of the power switch of the operation unit 105 is OFF and only the image viewing function is enabled as illustrated in FIG. 2B, the control unit 101 of the digital camera 100 does not perform a wireless communication with the remote control 300, which does not support the image viewing function, thus preventing useless wireless communication. Thus, useless power consumption can be avoided.

The above-described exemplary embodiment has been described using an example where the control unit 101 of the digital camera 100 performs control not to transmit an advertise packet, as in step S811 or S819, so as not to perform a wireless communication with another apparatus. To achieve this, for example, the following control can also be adopted. More specifically, the control unit 101 of the digital camera 100 transmits an advertise packet including information indicating that a connection for the wireless communication with the other apparatus is not possible. In this case, the remote control 300 and the smartphone 200 refer to the information included in the advertise packet, recognize that a connection is not possible, and therefore do not transmit a connection request. For example, before step S1003 and step S1102, the smartphone 200 and the remote control 300 respectively determine whether an advertise packet includes information indicating that a connection is not possible. When the advertise packet includes information indicating that a connection is not possible, the smartphone 200 or the remote control 300 does not transmit a connection request. The above-described processing enables controlling the digital camera 100 not to perform a wireless communication with another apparatus.

The above-described exemplary embodiments are to be considered as illustrative, and not restrictive of the technical scope of the present disclosure. More specifically, the present disclosure can be embodied in diverse forms without departing from the technical concepts or essential characteristics thereof.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-109336, filed Jun. 1, 2017, which is hereby incorporated by reference herein in its entirety.

What is claimed is:

1. A communication apparatus comprising:
a power source;
a power switch;
a wireless communication unit; and
one or more processors operating to establish a wireless communication with a selected external apparatus from among a plurality of external apparatuses including a first external apparatus and a second external apparatus,
wherein, in a first state where an operation state of the power switch is OFF, the wireless communication unit performs control to establish a wireless communication with the first external apparatus and not to establish a wireless communication with the second external apparatus,
wherein, in a second state where the operation state of the power switch is ON and power supply from the power source to at least the one or more processors is limited, the wireless communication unit performs control to establish a wireless communication with the first and the second external apparatuses,
wherein, in a third state where the operation state of the power switch is ON and the power supply from the power source to the one or more processors is not limited, the wireless communication unit performs control to establish a wireless communication with the first and the second external apparatuses, and
wherein, upon receipt of an operation request from the selected external apparatus in the second state, the communication apparatus enters the third state.

2. The communication apparatus according to claim 1,
wherein, in a case where the operation state of the power switch is ON, the one or more processors sets a first function and a second function different from the first function as an enabled function, and
wherein, in a case where the operation state of the power switch is OFF, the one or more processors sets the second function as the enabled function.

3. The communication apparatus according to claim 2, wherein, in a case where the second function is set as the enabled function, the communication apparatus performs control not to establish a wireless communication with the second external apparatus.

4. The communication apparatus according to claim 2, further comprising:
an imaging unit; and
a recording medium;
wherein the one or more processors stores images in the recording medium,
wherein the first function is an imaging function for generating an image using the imaging unit by the one or more processors and recording the image in the recording medium by the one or more processors, and
wherein the second function is a function of viewing the recorded images by the one or more processors.

5. The communication apparatus according to claim 1, wherein, in a case where a remaining battery capacity is less than or equal to a predetermined amount in the second state, the communication apparatus does not enter the third state, even upon receipt of the operation request from the selected external apparatus.

6. The communication apparatus according to claim 1, wherein, not establishing the wireless communication includes the wireless communication unit not performing connection processing for the wireless communication with the selected external apparatus.

7. The communication apparatus according to claim 1, wherein, not establishing the wireless communication includes the wireless communication unit transmitting information indicating that a connection for the wireless communication with the selected external apparatus is not possible.

8. A method for controlling a communication apparatus including a power source, a power switch, and a wireless communication unit that establishes a wireless communication with a selected external apparatus from among a plurality of external apparatuses including a first external apparatus and a second external apparatus, the method comprising:

controlling, in a first state where an operation state of the power switch is OFF, to establish a wireless communication with the first external apparatus and not to establish a wireless communication with the second external apparatus, controlling, in a second state where the operation state of the power switch is ON and power supply from the power source to at least the one or more processors is limited, to establish a wireless communication with the first and the second external apparatuses, and controlling, in a third state where the operation state of the power switch is ON and the power supply from the power source to the one or more processors is not limited, to establish a wireless communication with the first and the second external apparatuses, wherein, upon receipt of an operation request from the selected external apparatus in the second state, the communication apparatus enters the third state.

9. A non-transitory computer readable storage medium storing a program for causing a communication apparatus to execute a control method, the communication apparatus including a power source, a power switch, and a wireless communication unit that establishes a wireless communication with a selected external apparatus from among a plurality of external apparatuses including a first external apparatus and a second external apparatus, the control method comprising:

controlling, in a first state where an operation state of the power switch is OFF, to establish a wireless communication with the first external apparatus and not to establish a wireless communication with the second external apparatus, controlling, in a second state where the operation state of the power switch is ON and power supply from the power source to at least the one or more processors is limited, to establish a wireless communication with the first and the second external apparatuses, and controlling, in a third state where the operation state of the power switch is ON and the power supply from the power source to the one or more processors is not limited, to establish a wireless communication with the first and the second external apparatuses, wherein, upon receipt of an operation request from the selected external apparatus in the second state, the communication apparatus enters the third state.

* * * * *